No. 872,276.

PATENTED NOV. 26, 1907.

W. COOK.
CAR ARRESTER.
APPLICATION FILED SEPT. 28, 1907.

2 SHEETS—SHEET 1.

WITNESSES
E. G. Bromley,
Wm. P. Patton

INVENTOR
William Cook
BY
ATTORNEYS

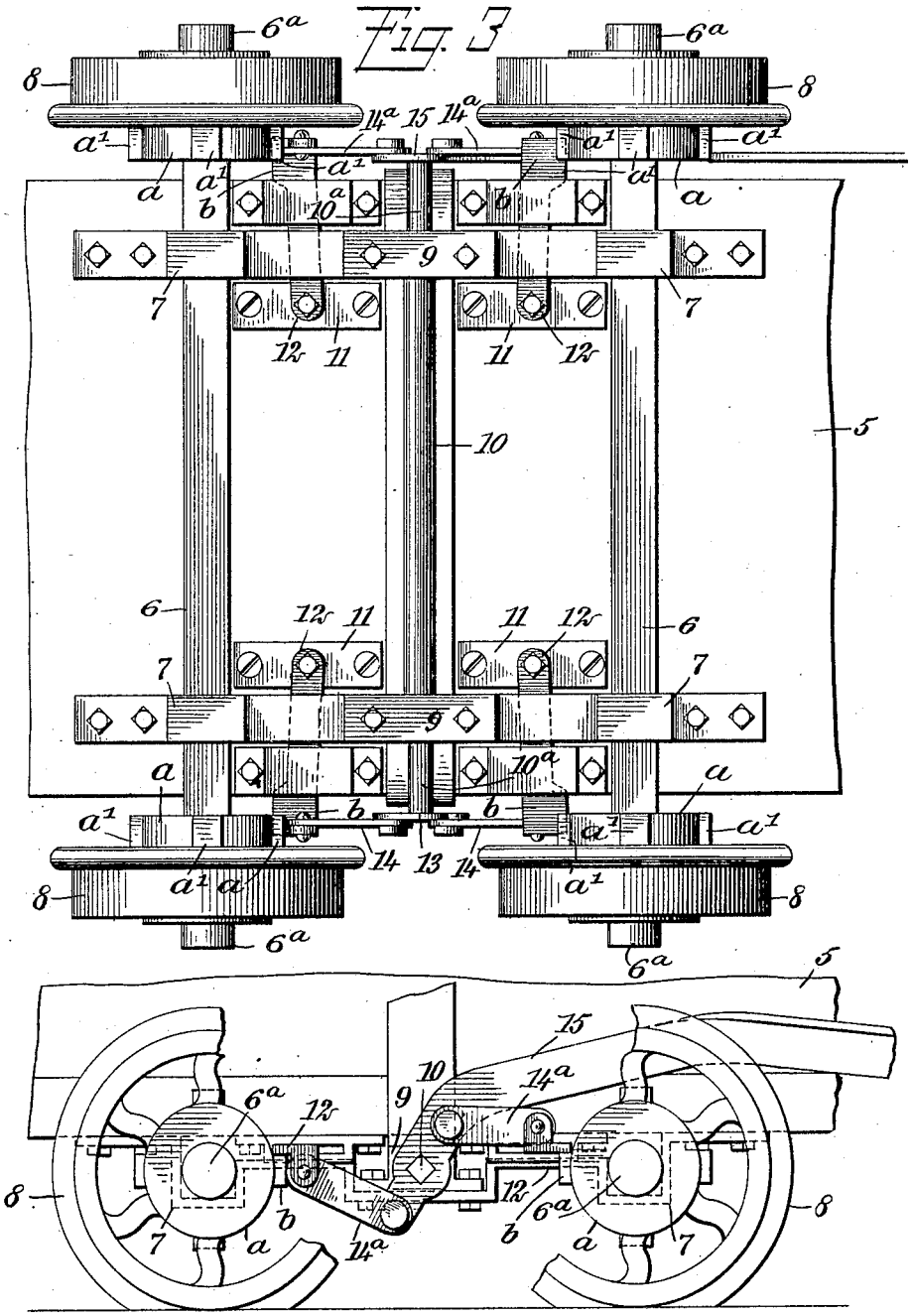

UNITED STATES PATENT OFFICE.

WILLIAM COOK, OF BROADHEAD, COLORADO.

CAR-ARRESTER.

No. 872,276.  Specification of Letters Patent.  Patented Nov. 26, 1907.

Application filed September 28, 1907. Serial No. 394,973.

*To all whom it may concern:*

Be it known that I, WILLIAM COOK, a citizen of the United States, and a resident of Broadhead, in the county of Las Animas and State of Colorado, have invented a new and Improved Car-Arrester, of which the following is a full, clear, and exact description.

This invention relates to means for spragging or arresting cars while traversing a car track, and has for its object to provide novel details of construction that may be readily placed upon a car, and afford convenient reliable means for quickly arresting a car having the improvement, while it is in motion; and by manipulation of a lever at one side of the car body release said car for free movement on the track.

The invention consists in the novel construction and combination of parts as is hereinafter described and defined in the appended claims.

Reference is to be had to the accompanying drawings forming a part of this specification, in which similar characters of reference indicate corresponding parts in all the views.

Figure 1:
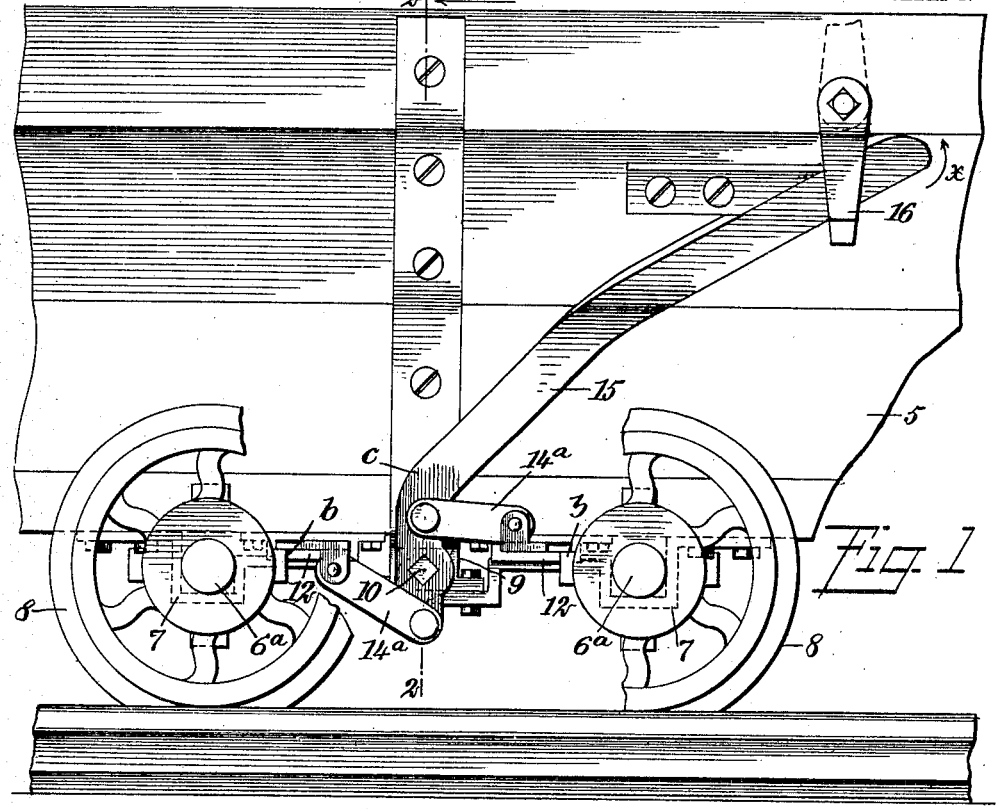
Figure 2:
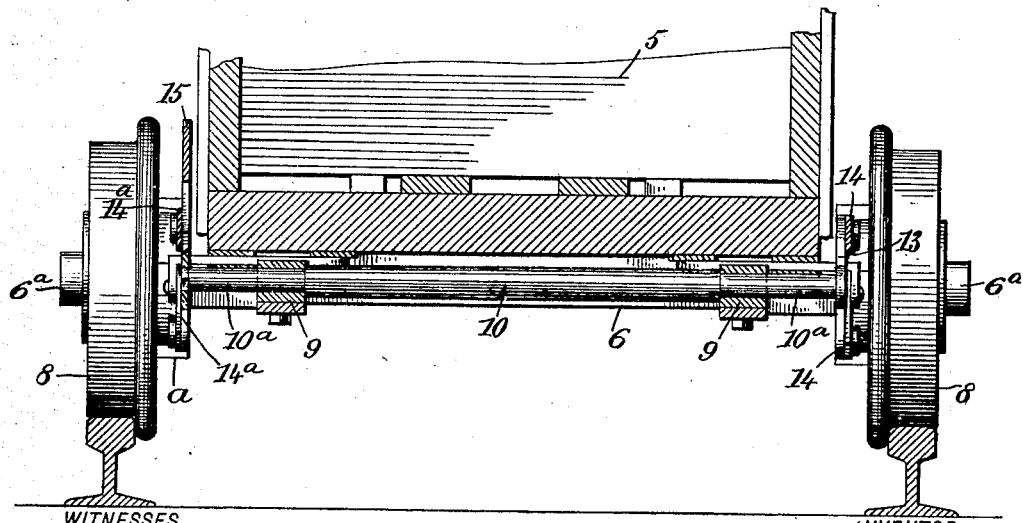

Figure 1 is a side view in part of a car body and wheels thereon, and of the improvement mounted upon the car, and adjusted for free travel of said car; Fig. 2 is a transverse sectional view, substantially on the line 2—2 in Fig. 1; Fig. 3 is a reversed plan view of the car, wheels thereon, and of the improved arrester device mounted upon the bottom of the car body; and Fig. 4 is a side view of a car body in part, the wheels therefor broken away, and the improved car arrester carried by the car body and adjusted for locking the hubs of the car wheel for preventing their rotation.

In the drawings, 5 indicates a pit or mine car body, such as is used for hauling coal, ore, or the like in bulk, and 6 a pair of axles transversely secured upon the bottom of the car body, and suitably spaced apart by means of two pairs of clamps 7, that are formed for embracing the square bodies of the axles. As usual in this class of freight hauling cars, the car wheels are loosely mounted upon spindles 6ª that are integral with the axles 6 and project exterior of the car body at each side thereof.

The car wheels 8, of equal size, are formed with central hubs *a* which extend inwardly an equal degree and in their central bores receive the spindes 6ª of the axles 6, said wheels being held free to rotate on the spindles by any suitable means. A plurality of lugs *a'* are formed on the periphery of each hub *a*, preferably at equal distances apart, and having an equal degree of projection therefrom.

In boxes 9, that are connected with the clamps 7, journal ends 10ª of a transverse rock shaft 10, are loosely mounted. Bearing plates 11 are secured upon the bottom of the car body 5 between the rock shaft 10 and each axle 6, said plates being positioned near each side of the car body. Four latch dogs 12 of similar form are imposed upon the bearing plates 11, one each side of the rock shaft 10, at each side of the car body. The latch dogs 12 are in the form of flat bars of an equal length, each one having a thickened latch head *b* on one end that projects laterally.

The flat body portion of each latch dog is seated upon and in a respective pair of bearing plates 11, the inner end of said body being pivoted upon the bearing plate it has contact with, the outermost bearing plate of each pair being slotted and the dog working therein. The latch dogs 12 all project outwardly, so as to cause the head *b* thereon to face the adjacent hub *a* of a respective wheel 8, and as the flat bodies of said dogs pass loosely below the clamps 7, in the recesses formed therein, it will be seen that the latch heads *b* may be rocked toward or from the hubs *a* of the wheels 8. Upon one extremity of the rock shaft 10 a rocking block 13 is secured at its center so that an arm is projected of an equal length from the center of the shaft.

A link 14 is pivoted by one end on each latch dog 12, at one side of the car body 5, near its head *b*, and at the opposite end is pivoted upon a respective end of the adjacent rocking block 13, which links being of an equal length, serve to hold the heads *b*, rocked away from the hubs *a*, when the longitudinal plane of the rocking block is disposed vertically and throw the said latch heads toward the hubs for interlocking engagement with the lugs *a'*, on the hubs, when the rocking block is inclined a suitable degree. Upon the other end of the rock shaft 10, the lower end portion of a tripping lever 15 is secured, and as shown in Fig. 1, said lever is bent at *c* and thence extends upward and forward, engaging a latch hook 16, that is pivoted by its upper end on the car body, so that it may be hooked upon the lower edge of the lever and retain it in elevated adjustment.

A short end of the lever 15 extends below the end of the rock shaft 10 and upon said end of the lever one end of a link 14ª, similar to the links 14, is lapped and pivoted, the other end of this link being pivoted upon a corresponding latch dog 12, whereon it is lapped near the latch head *b* thereon. Upon the body of the lever 15 above the rock shaft 10, an end portion of another link 14ª is lapped and pivoted at a distance from the center of the rock shaft, equal with the distance between said shaft center and the pivot that connects the other link 14ª with the end portion of the lever.

It will be evident that if the lever 15 is raised so as to engage its upper end with the hook 16, the links 14, 14ª, will be retracted sufficiently to rock the heads *b* of the latch dogs 12 away from the hubs *a* and thus permit a free rotation of the car wheels 8. When it is desired to arrest the car in its forward or rearward movement, it is only necessary to push the hook 16 in direction of the curved arrow *x* in Fig. 1, which will release the lever 15 and permit it to drop by gravity, whereupon the links 14, 14ª will all be projected toward the hubs *a*, and push the latch dogs correspondingly, thus causing the heads *b* of the dogs to interlock with the lugs *a'* and stop the car.

Obviously the device may be slightly changed to employ but one pair of dogs for locking either pair of car wheels by dispensing with the other pair, but the preference is given to the employment of two pairs of dogs and their operative connections hereinbefore fully described.

Having thus described my invention, I claim as new and desire to secure by Letters Patent,—

1. In a car arrester, the combination with a car, axles thereon, and wheels rotatable on the axles, of lugs on the hubs of the wheels, latch dogs rockable on the car that may interlock with the lugs, and means for manually rocking the dogs toward and from the lugs.

2. In a car arrester, the combination with a car body, two axles transversely secured on the bottom of said car body, wheels rotatable on the ends of the axles, and radial lugs on the hubs of said wheels, of latch dogs pivoted on the bottom of the car body, the heads of which will interlock with the lugs when the dogs are rocked toward the wheel hubs, and means for manually rocking the dogs.

3. In a car arrester, the combination with a car body, axles transversely secured on the bottom of the car body, wheels rotatable on the ends of the axles, hubs on the wheels and radial lugs on said hubs, latch dogs pivoted on the car bottom, the heads of which will interlock with the lugs when the dogs are rocked toward the hubs, a rock shaft disposed transversely on the car body bottom, means connecting the rock shaft with the dogs for their rocking movement, and means for manually rocking said shaft.

4. In a car arrester, the combination with a car body, axles transversely secured on the bottom of the car body, wheels rotatable on the ends of the axles, radial lugs on the hubs of the wheels, and latch dogs pivoted by an end of each on the bottom of the car body and that will interlock with the lugs when the dogs are rocked toward the hubs, of a rock shaft rockable on the bottom of the car, a lever on one end of the rock shaft adapted for manipulation, dogs rockable on the bottom of the car toward and from the wheel hubs, and means connecting the rock shaft and lever with the dogs for their rocking movement.

5. In a car arrester, the combination with a car body, axles transversely thereon, and wheels rotatable on said axles, the hubs of the wheels having radial lugs thereon, and a plurality of dogs pivoted by one end of each upon the bottom of the car body, and that may interlock with the lugs when said dogs are rocked toward the hubs, of a rock shaft journaled on the bottom of the car near each of its ends, a lever on one end of the rock shaft, links pivoted on the lever and also on two adjacent latch dogs, a rockable block on the other end of the lever, and links connecting said block with the remaining pair of latch dogs.

In testimony whereof I have signed my name to this specification in the presence of two subscribing witnesses.

WILLIAM COOK.

Witnesses:
 JAMES LOWMAN,
 E. D. JONES.